United States Patent [19]

Long

[11] 3,866,063

[45] Feb. 11, 1975

[54] IMPROVED RECTIFYING CIRCUIT

[75] Inventor: David K. Long, Sunnyvale, Calif.

[73] Assignee: Fairchild Camera and Instrument Corporation, Mountain View, Calif.

[22] Filed: Oct. 23, 1973

[21] Appl. No.: 408,682

[52] U.S. Cl. .................. 307/230, 307/237, 328/150, 328/153, 330/13, 330/28, 307/313

[51] Int. Cl. ......... H03k 5/08, H03f 3/18, H03f 1/34

[58] Field of Search ........... 307/230, 244, 313, 237; 330/13, 17, 28, 30 R, 83; 328/150, 153

[56] References Cited

UNITED STATES PATENTS

| | | | |
|---|---|---|---|
| 3,077,545 | 2/1963 | Rywak | 330/13 X |
| 3,471,714 | 10/1969 | Gugliotti, Jr. et al. | 307/230 |
| 3,529,253 | 9/1970 | Edge | 330/13 |
| 3,566,145 | 2/1971 | Goodale | 330/13 X |
| 3,600,696 | 8/1971 | Grandmont | 330/28 X |
| 3,760,288 | 9/1973 | Leonard | 330/17 X |
| 3,772,606 | 11/1973 | Waehner | 330/13 |

OTHER PUBLICATIONS

Freiman, "Eliminate Dead Zone in a Complementary Stage;" Electronic Design (pub.); 9/26/1968; pp. 70.

*Primary Examiner*—Michael J. Lynch
*Assistant Examiner*—L. N. Anagnos
*Attorney, Agent, or Firm*—Alan H. MacPherson, J. Ronald Richbourg

[57] ABSTRACT

An active diode circuit in which two matched pairs of transistors are connected together in the output circuit of an operational amplifier in such a manner as to provide a positive-going half-wave rectified output signal, a negative-going half-wave rectified output signal and an unrectified output signal. More particularly, a first NPN transistor and a first PNP transistor are interconnected between a first output terminal and the output of the operational amplifier in such a manner as to duplicate the amplifier output at the first output terminal; a second NPN transistor is connected in parallel with the first NPN transistor in such a manner as to develop the positive-going rectified output signal at a second output terminal; and the second PNP transistor is connected in parallel with the first PNP transistor in such a manner as to develop the negative-going rectified output signal at a third output terminal.

5 Claims, 5 Drawing Figures

IMPROVED RECTIFYING CIRCUIT

BACKGROUND OF THE INVENTION

1. Field of the Invention

The present invention relates generally to electronic rectifying devices and more particularly to an active diode circuit wherein matched pairs of bipolar transistors are utilized in conjunction with an operational amplifier to provide a triple output rectifying circuit having voltage swings substantially larger than heretofore available in prior art.

2. Description of the Prior Art

In theory, a diode is a device which conducts current in only one direction and while in the conductive state has input and output voltages which are essentially equal. When the diode is biased in the reverse direction, that is, in the direction which would tend to make the current flow in the direction opposite to the conductive direction, there will be no conduction.

In practice however, the diodes do have a forward voltage drop which is significant in the operation of many systems utilizing such rectifying devices. In such cases, it is usual to resort to the use of an active diode circuit wherein several discrete diodes are connected to an operational amplifier in such a manner that the total operational effect of the circuit is as though an ideal diode were incorporated. However, the disadvantage of this type of approach is that the total output voltage available is still no greater than the supply voltage minus the forward voltage drop across the output diode (about ½ volt) and the internal limitations of the operational amplifier.

Using the active diode configuration, the op-amp circuit is typically capably of swinging within 1 volt of the supply. Adding this 1 volt drop to the ½ volt diode drop means that the maximum available voltage will be 1 ½ volts less than the supply voltage. Although the loss of the 1 ½ volts may be inconsequential in many applications, it is of substantial consequence in certain automotive applications and the like wherein the voltage supply is low at the outset. For example, in fuel injection applications which must operate when the battery is low and the engine is being started at low temperatures, the typical supply voltage is only 6 volts and the loss of 1 ½ volts on each end will be quite serious.

SUMMARY OF THE PRESENT INVENTION

It is therefore a principle objective of the present invention to provide an active diode circuit in which the prior art output swing limitations are substantially improved.

Another objective of the present invention is to provide an active diode circuit for accomplishing the above stated objective using monolithic integrated circuit technology.

Briefly, the present invention includes an operational amplifier combined with two PNP transistors and two NPN transistors in such a manner as to provide one output signal for the positive going portion of an input signal, one output signal for the negative going portion of an input signal, and a third output signal which corresponds to both positive and negative going portions of the input signal. More particularly, one of the NPN transistors and one of the PNP transistors are interconnected between a first output terminal and the op-amp output in such a manner as to duplicate the op-amp output at the first output terminal, the second NPN transistor is connected in parallel with the first NPN transistor to develop a rectified output of one polarity and a second output terminal, and the second PNP transistor is connected in parallel with the first PNP transistor and is operative to develop a rectified output of the opposite polarity at a third output terminal.

Among the advantages of the present invention is that it provides an active diode device and is capable of developing three separate output signals, two of which are rectified signals of opposite polarity and a third output signal which is a composite of the other two with each swinging within one volt of the supply voltage.

Other objects and advantages of the present invention will no doubt become apparent to those of ordinary skill in the art after having read the following detailed description of the preferred embodiments which are illustrated in the several figures of the drawing.

IN THE DRAWING

DETAILED DESCRIPTION OF THE PREFERRED EMBODIMENT

Figure 1:
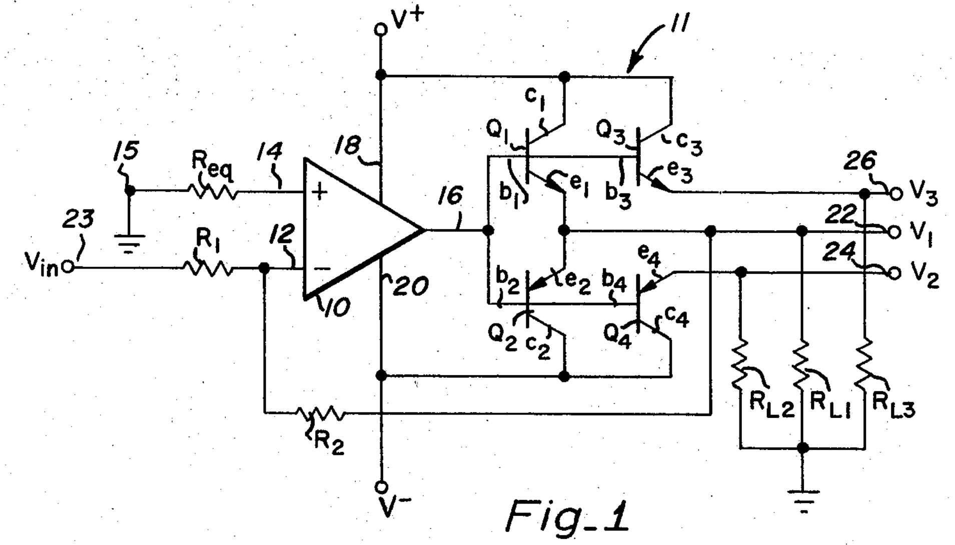
FIG. 1 is a simplified schematic diagram illustrating an active diode circuit in accordance with the present invention.

Referring now to FIG. 1 of the drawing, a simplified embodiment of an active diode circuit in accordance with the present invention is shown. The circuit is generally comprised of an operational amplifier 10, an active rectifying circuit 11, and various input, output and power supply terminals as shown. Op-amp 10 includes an inverting input 12, a non-inverting input 14 and an output 16. A positive source of potential $V^+$115 is applied at 18 and a negative source of potential $V^-$ is applied at 20. Op-amp input 12 is coupled to the circuit input terminal 23 through an input resistor $R_1$ and is connected to a circuit output terminal 22 by a feedback resistor $R_2$ as will be explained in more detail below. The non-inverting input 14 is coupled to circuit ground at 15 through an equivalent resistor $R_{eq}$ which is selected to have a resistive valve equal to the parallel resistive values resistors $R_1$ and $R_2$. $R_{eq}$ compensates for the input bias current and causes the non-rectified output of the circuit to be equal to $-V_{in}(R_2/R_1)$.

The rectifying circuit 11 is connected between the output 16 of op-amp 10 and the three output terminals 22, 24, and 26 and includes four transistors $Q_1$, $Q_2$, $Q_3$ and $Q_4$. Transistor $Q_1$ is an NPN transistor having its base $b_1$ connected to op-amp output 16, its collector $c_1$ connected to the voltage supply $V^+$, and its emitter $e_1$ connected to output terminal 22. Transistor $Q_2$ is a PNP transistor having its base $b_2$ connected to op-amp output 16, its collector $c_2$ connected to the negative power supply $V^-$, and its emitter $e_2$ connected to output terminal 22. Transistor $Q_3$ is an NPN transistor having its base $b_3$ connected to op-amp output 16, its collector $c_3$ connected to the positive power supply $V^+$, and its emitter $e_3$ connected to output terminal 26, Transistor $Q_4$ is a PNP device having its base $b_4$ connected to op-amp output 16, its collector $c_4$ connected to the negative power supply $V^-$, and its emitter $e_4$ connected to output terminal 24.

The output voltages $V_1$, $V_2$ and $V_3$ are taken across load resistors $R_{L1}$, $R_{L2}$ and $R_{L3}$ respectively at terminals 22, 24 and 26. As indicated previously, feedback for the circuit is accomplished by means of a circuit including resistor $R_2$ which is connected between output terminal 22 and the inverting input 12 of op-amp 10. Although the transistors $Q_1 - Q_4$ may be discrete elements carefully selected to have matched operational parameters over a particular temperature range, in the preferred embodiment these elements are integrated circuit devices having equal base, emitter and collector elemental areas formed in a common semiconductive chip including the op-amp 10. As a result, transistors $Q_1$ and $Q_3$ are identical and experience identical current flows, and transistors $Q_2$ and $Q_4$ are likewise identical and experience equal current flows so long as the respective load currents are the same. Good thermal coupling within the monolithic structure aids in this matching.

In operation, for a given input signal $V_{in}$ applied to input terminal 23, an amplified signal will be developed at the op-amp output 16 which will tend to either forward bias or reverse bias the transistors $Q_1 - Q_4$ depending upon whether the voltage is positive or negative. For positive voltages developed at 16, the base-to-emitter junctions of transistors $Q_1$ and $Q_3$ will be forward biased causing $Q_1$ and $Q_3$ to conduct as soon as the base-to-emitter potentials exceed $1V_{BE}$. Similarly, for negative voltages developed at op-amp output 16, transistors $Q_2$ and $Q_4$ will be forward biased, causing $Q_2$ and $Q_4$ to conduct as soon as the base-to-emitter potential exceeds $1V_{BE}$. Accordingly, for positive-going outputs, the voltage at terminal 26 may be expressed generally as (1)

$$V_3 = V_1 + V_{OS1-3}$$

and for negative going outputs the voltage output at terminal 24 may be expressed as (2)

$$V_2 = V_1 + V_{OS2-4}$$

where $V_{OS1-3}$ and $V_{OS2-4}$ are the offset voltage errors caused by imperfect matching between the transistors indicated by the subscript. In both cases the output voltage $V_1$ may be expressed as $$V_1 = -V_{in}(R_2/R_1) + V_{OS}(1R_2/R_1) \quad (3)$$

where $V_{OS}$ is the input offset voltage of the op-amp 10.

In their more complex forms the output voltages $V_2$ and $V_3$ may respectively be expressed as $$V_2 = -V_{in}(R_2/R_1) + V_{OS}(1+R_2/R_1) + V_{OS2-4} \quad V_{in}<0 \quad (4)$$

$$V_3 = -V_{in}(R_2/R_1) + V_{OS}(1+R_2/R_1) + V_{OS1-3} \quad V_{in}>0 \quad (5)$$

Conduction of transistors $Q_3$ and $Q_4$ in the modes opposite to those discussed above is dependent upon the design of the output stage including transistors $Q_1$ and $Q_2$. Ideally, as voltage $V_1$ falls, transistor $Q_1$ should conduct progressively less until $V_1 = 0$, then the current $I_{Q1}$ should equal $I_{Q2}$ should equal 0. As voltage $V_1$ falls below 0 potential, transistor $Q_1$ should cease to conduct and all of the load current should be carried by transistor $Q_2$. In practice however, transistor $Q_1$ and $Q_2$ will either have a deadband as illustrated or will be prebiased so that their conductive phases overlap.

In the case of deadband operation, transistor $Q_1$ will conduct for all positive output voltages. When $V_1 = 0^+$ transistor $Q_1$ will reach 0 current and transistor $Q_2$ will still be biased OFF. Voltage $V_3$ will be equal to a fraction of $V_{OS\ 1\text{-}3}$ and $V_2$ will be 0. A small positive change in $V_{in}$ will cause the drive of transistors $Q_1$ and $Q_2$ to change at a rate set by the open loop gain and slew rate until transistor $Q_1$ is reverse biased and transistor $Q_2$ is on the verge of conduction. Then voltage $V_3$ will be 0 and voltage $V_2$ will be equal to a fraction of $V_{OS2\text{-}4}$. The amount of input voltage change required to achieve this switching is $$\Delta V_{in} = 2V_D/A_{VOL} \quad (6)$$

where $2V_D$ is the deadband voltage between the swings of $Q_1$ and $Q_2$ and $A_{VOL}$ is the open loop voltage gain of the op-amp 10. In the illustration, $2V_D$ is approximately equal to $2V_{be}$.

For an open loop voltage gain of 80db and a deadband voltage of 1V, the equivalent input deadband voltage is 0.1mV. For negative values of $V_1$, transistor $Q_3$ will be reverse biased and voltage $V_3$ will be 0 except when $V_1$ is more than $(V_{BE}+BV_{EBO})$ below ground where $BV_{EBO}$ is the emitter-base breakdown voltage. In the latter condition, $V_3$ will follow $V_1$ as transistor $Q_3$ is forced to conduct in the reverse breakdown mode. In applications where the supply voltage is less than $2(V_{BE}+BV_{EBO})$ this phenomenon will not be experienced.

The total effective offset of the device is a function of both input and output offset voltages and the offset voltages can be adjusted by trimming the three load resistors $R_L$. It may be possible to use the technique to take care of both input and output offset voltages.

Figure 2:
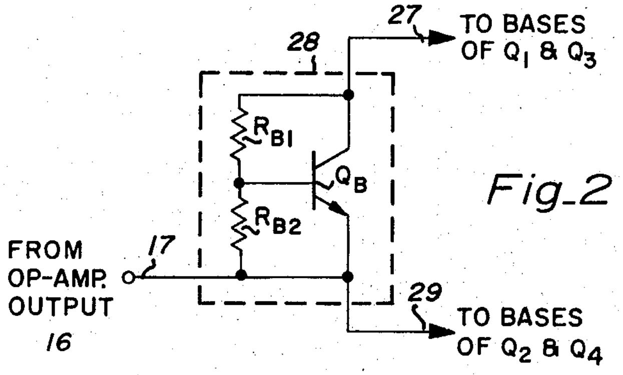
FIG. 2 is a schematic diagram illustrating a prebiasing circuit for use in accordance with the circuit illustrated in FIG. 1.
Figure 3:
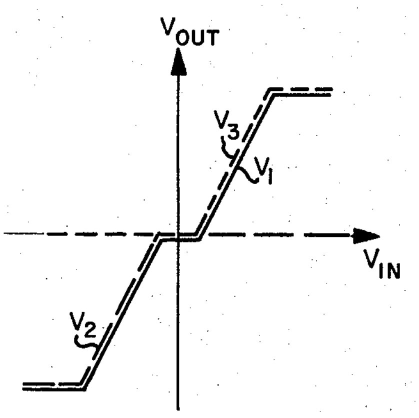
FIG. 3 is a diagram illustrating a transfer characteristic of the circuit shown in FIG. 1.
Figure 4:
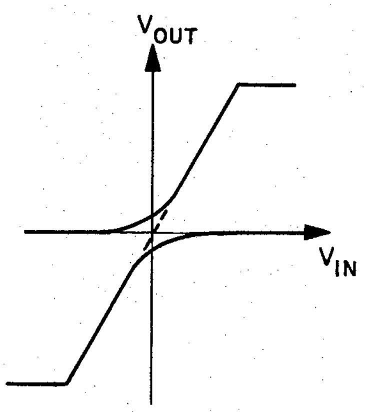
FIG. 4 is a diagram illustrating the transfer characteristic of an active diode circuit of the type shown in FIG. 1 modified to include the pre-biasing circuit shown in FIG. 2.

Although it may be undesirable for some applications to have both $Q_1$ and $Q_2$ conducting simultaneously as this will cause unwanted outputs $V_2$ and $V_3$, a prebiasing circuit such as that illustrated at 28 in FIG. 2 may be incorporated into the circuit shown in FIG. 1. Although many circuit configurations could be utilized, the basic circuit illustrated includes a single NPN transistor $Q_B$ and a pair of biasing resistors $R_{B1}$ and $R_{B2}$. $R_{B1}$ is connected between the base and collector of $Q_B$, and $R_{B2}$ is connected between the base and emitter. In incorporating the bias circuit 28 into the circuit of FIG. 1, terminal 17 is connected to op-amp output 16, the collector $Q_B$, terminal 27, is connected to the base $b_1$ of $Q_1$, and the emitter of $Q_B$, terminal 29, is connected to the base $b_2$ of $Q_2$.

The effect of the two resistors $R_{B1}$ and $R_{B2}$ is to multiply the emitter-base potential of $Q_B$ by $(1 + R_{B1}/R_{B2})V_{BE}$.

Figure 5:
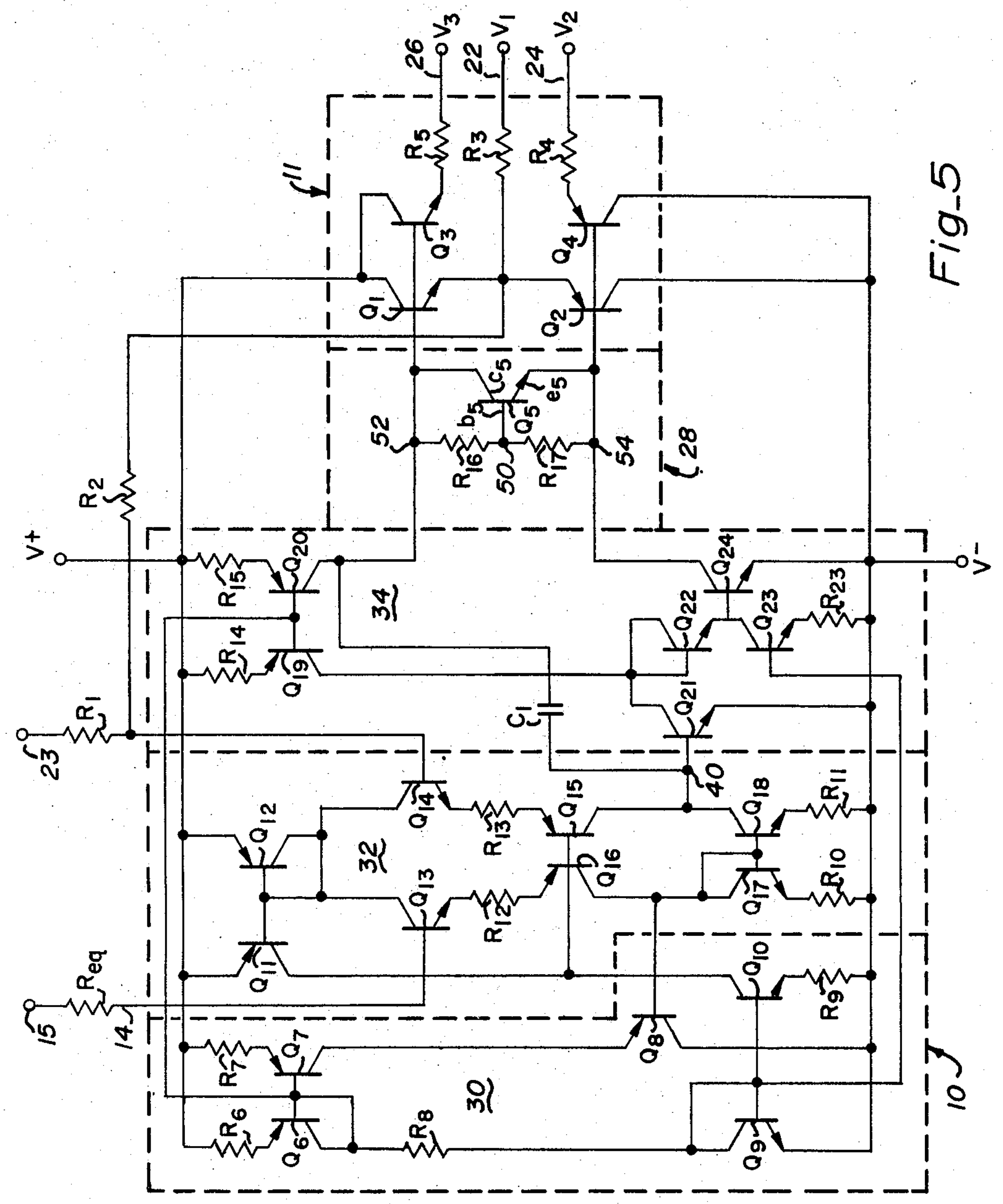
FIG. 5 is a detailed schematic representative of an actual embodiment of an integrated circuit version of an active diode circuit in accordance with the present invention.

Referring now to FIG. 5 of the drawing, a more detailed schematic diagram of a complete active diode circuit suitable for integrated circuit applications is illustrated. Like callout numbers and letters in FIGS. 1 and 5 refer to corresponding elements. The operational amplifier portion of the circuit is shown enclosed in the dashed lines 10 and is comprised of a biasing section 30, a first amplifying stage 32 and a second amplifying stage 34. The biasing portion 30 includes three PNP transistor devices $Q_6$, $Q_7$ and $Q_8$, two NPN transistors $Q_9$ and $Q_{10}$, and four resistor elements $R_6$, $R_7$, $R_8$ and $R_9$ connected together as illustrated in the drawing. This section is operative to provide appropriate biasing levels to the amplifying stages 32 and 34.

Amplifying stage 32 is comprised of four PNP transistors $Q_{11}$, $Q_{12}$, $Q_{15}$ and $Q_{16}$, four NPN transistors $Q_{13}$, $Q_{14}$, $Q_{17}$ and $Q_{18}$, and four resistor elements $R_{10}$, $R_{11}$, $R_{12}$ and $R_{13}$. This stage includes a differential input to the bases of transistors $Q_{13}$ and $Q_{14}$ through resistors $R_{eq}$ and $R_1$ respectively (input terminals 15 and 23), and a single-ended output at circuit node 40. Transistors $Q_{11}$ and $Q_{12}$ provide additional biasing for the stage while transistors $Q_{15}$ and $Q_{16}$ provide common mode feedback for setting the bias level of the output stage in such a way that it is independent of variations in PNP beta. Transistor $Q_{17}$ reflects the input current into the transistor $Q_{18}$ so that there is no gain loss as would be the case if the collector $Q_{16}$ were coupled to ground.

In the second stage 34, transistor $Q_{21}$ is an emitter follower having its base coupled to the output 40 of the first stage and provides current gain but no voltage gain. Transistor $Q_{22}$ is a level shifting device which brings the voltage down again to the base potential of transistor $Q_{24}$. Transistor $Q_{24}$ is a common emitter amplifier having a very high gain. Transistors $Q_{19}$ and $Q_{20}$ provide bias for the second stage, and the transistor $Q_{23}$ acts as a current source for the level shifter $Q_{22}$. Frequency response compensation is provided by capacitor $C_1$ which feeds back a signal from the output of the second stage to the input of that stage in a conventional manner.

In addition to the four output elements $Q_1$, $Q_2$, $Q_3$ and $Q_4$, this circuit also includes a pre-biasing circuit 28 which includes the transistor $Q_5$ and a pair of resistors $R_{16}$ and $R_{17}$ which are connected in series between the collectors of transistors $Q_{20}$ and $Q_{24}$. The base $b_5$ of transistor $Q_5$ is connected to the junction of $R_{16}$ and $R_{17}$, the collector $c_5$ is connected to the base of transistor $Q_1$, and the emitter $e_5$ is connected to the base of transistor $Q_2$. Resistors $R_{16}$ and $R_{17}$ serve as a $V_{BE}$ multiplier as previously described. The operation of the circuit is limited in the positive direction by the saturation voltage of $Q_{20}$ and in the negative direction by the saturation voltage of $Q_{24}$. The pre-biasing circuit provides partial bias to $Q_1$ and $Q_2$ so that the voltage of the circuit node 52 does not have to swing two $V_{BE}$ to commute the conductance from $Q_1$ to $Q_2$, i.e., it only has to go through a fraction of the $V_{BE}$ as set by the resistors $R_{16}$ and $R_{17}$ and that fraction of $V_{BE}$ is the deadband shown in the transfer characteristic.

When the output 22 is positive with respect to the load, $Q_3$ is conductive and $Q_2$ is non-conductive. When $Q_1$ is conductive $Q_3$ will also be conductive. And since $Q_2$ is non-conductive, $Q_4$ will also be non-conductive so that the output at terminal 22 is positive and the output at terminal 24 is 0. The pre-bias provided by transistor $Q_5$ assures that $Q_1$ and $Q_2$ do not conduct at the same time since maximum differential voltage between their bases can only be equal to one diode drop which is that across the emitter base junction of transistor $Q_5$.

When loads-to-ground are coupled to the emitters of transistors $Q_3$ and $Q_4$, current will flow from either of the two transistors depending upon the state of the input signal. If equal loads are applied in the outputs of $Q_3$ and $Q_4$, for example, if $Q_1$ is conducting, $Q_3$ will have the same base potential and have equal emitter current. When the output reaches the load reference voltage, $Q_1$ will cut OFF and so will $Q_3$. $Q_2$ and $Q_4$ will then turn ON and will carry equal currents. Therefore, the output from the emitter of $Q_4$ will be a replica of the negative-going portion of the output voltage on the common point between $Q_1$ and $Q_2$, i.e., output terminal 22, whereas the output developed at the emitter of $Q_3$ will be a replica of the positive-going portion of this signal. This circuit has the advantage that the output swing available from the rectified outputs (terminals 24 and 26) is equal to the output swing that is available from the normal amplified output at terminal 22.

Whereas the conventional active diode connection requires an additional diode connected externally from the regular output of the amplifier so that the total output swing is reduced by an amount equal to one emitter base drop which is on the order of 0.6V. The present invention is of particular advantage when the system is designed to operate with a low supply voltage and provides the additional advantage that both positive-going and negative-going diode effects are achieved sismultaneously with one circuit and that these and matched in output capability to the output of the operational amplifier. If desired, all three outputs may be connected together and the device may operate as a conventional amplifier. However, in this mode there will be some cross-over distortion due to the biasing provided by $Q_5$.

Although the present invention has been described in terms of preferred embodiments which are described above for purposes of illustration, it is contemplated that other alterations and modifications will become apparent to those of ordinary skill in the art. Accordingly, the appended claims are to be interpreted as covering all such alterations and modifications as fall within the true spirit and scope of the invention.

What is claimed is:

1. A rectifying circuit having first, second, and third output terminals comprising:

a. operational amplifying means responsive to an input signal and operative to develop an amplified signal commensurate therewith, which includes an inverting input terminal, and a feedback circuit coupled between said inverting input terminal and the first output terminal;

b. a first NPN transistor having a base element coupled to the output of said operational amplifying means, a collector element for connection to a power supply of positive potential and an emitter element connected to the first output terminal;

c. a first PNP transistor having a base element coupled to the output of said operational amplifying means, a collector element for connection to a power supply of negative potential, and an emitter element connected to the first output terminal, said first NPN transistor and said first PNP transistor being operative to develop a non-rectified output signal at the first output terminal corresponding to said amplified signal;

d. a second NPN transistor having a base element coupled to the output of said operational amplifying means, a collector element for connection to said power supply of positive potential and an emitter element connected to the second output terminal, said second NPN transistor being operative to develop a first rectified output signal corresponding to positive-going polarities of said signal;

e. a second PNP transistor having a base element coupled to the output of said operational amplifying means, a collector element for connection to said power supply of negative potential and an emitter element connected to said third output terminal, said second PNP transistor being operative to develop a second rectified output signal corresponding to negative-going polarities of said amplified signal; and f. a pre-biasing circuit means including a third NPN transistor having a base element coupled to the output of said operational amplifying means, a collector element connected to the base of said first NPN transistor and an emitter element connected to the base of said first PNP transistor.

2. A rectifying circuit as recited in claim 1 wherein said pre-biasing circuit means further includes a first biasing resistor connected between the base and collector elements of said third NPN transistor, and a second biasing resistor connected between the base and emitter elements of said third NPN transistor.

3. A rectifying circuit having first second and third output terminals, comprising:

an operational amplifier having an inverting input terminal, a non-inverting input terminal and an amplifier output terminal;

a first bipolar transistor having a base element coupled to said amplifier output terminal, a collector element for connection to a power supply of positive potential and an emitter element coupled to said first output terminal;

a second bipolar transistor having a base element coupled to said amplifier output terminal, a collector element for connection to a power supply of negative potential and an emitter element coupled to said first output terminal;

a third bipolar transistor having a base element coupled to said amplifier output terminal, a collector element for connection to the collector element of said first bipolar transistor and an emitter element coupled to said second output terminal;

a fourth bipolar transistor having a base element coupled to said amplifier output terminal, a collector element coupled to the collector element of said second bipolar transistor and an emitter element coupled to said third output terminal; and a feedback circuit coupling said first output terminal to said inverting input of said operational amplifier, whereby a positive-going voltage applied to said inverting input terminal causes a negative-going output voltage to be developed on said first and third output terminals, and a negative-going voltage applied to said inverting input causes a positive-going output voltage to be developed on said first and second output terminals.

4. A rectifying circuit as recited in claim 3 wherein said first and third bipolar transistors are NPN devices and said second and fourth bipolar transistors are PNP devices.

5. A rectifying circuit as recited in claim 4 and further comprising a pre-biasing circuit including a fifth bipolar transistor having a base element coupled to said amplifier output terminal, a collector element coupled to the base element of said first bipolar transistor, and an emitter element coupled to the base element of said second bipolar transistor, whereby said fifth bipolar transistor causes said first bipolar transistor and said second bipolar transistor to be conductive for different operational amplifier output voltages.

* * * * *